US 6,648,301 B2

(12) United States Patent
Lee

(10) Patent No.: US 6,648,301 B2
(45) Date of Patent: Nov. 18, 2003

(54) STRUCTURE MANUAL TENSIONER

(76) Inventor: I-Ming Lee, 58-2, Ta Lun Street, Fu Hsing Hsiang, Chang-Hua (TW)

( * ) Notice: Subject to any disclaimer, the term of this patent is extended or adjusted under 35 U.S.C. 154(b) by 0 days.

(21) Appl. No.: 10/067,245

(22) Filed: Feb. 7, 2002

(65) Prior Publication Data

US 2003/0146424 A1 Aug. 7, 2003

(51) Int. Cl.$^7$ .................................................. B66F 3/00
(52) U.S. Cl. ...................................... 254/218; 254/223
(58) Field of Search ................................ 254/217, 218, 254/222, 223, 224; 24/68 LD, 68 R

(56) References Cited

U.S. PATENT DOCUMENTS

| | | | | |
|---|---|---|---|---|
| 1,001,547 A | * | 8/1911 | McMillen | 254/217 |
| 1,099,319 A | * | 6/1914 | Snedeker | 254/218 |
| 2,506,029 A | * | 5/1950 | Maasdam | 254/369 |
| 2,889,136 A | * | 6/1959 | Prete, Jr. | 254/218 |
| 4,510,651 A | * | 4/1985 | Prete, Jr. et al. | 24/68 R |
| 6,076,805 A | * | 6/2000 | Messersmith | 254/218 |
| 6,095,450 A | * | 8/2000 | Jang | 242/388.5 |
| D434,295 S | * | 11/2000 | Liang | D8/44 |
| 6,499,197 B1 | * | 12/2002 | Huang | 24/68 CD |
| 2001/0045548 A1 | * | 11/2001 | Landy | 254/217 |

* cited by examiner

*Primary Examiner*—Kathy Matecki
*Assistant Examiner*—Evan Langdon
(74) *Attorney, Agent, or Firm*—Bacon & Thomas, PLLC

(57) ABSTRACT

An improved structure manual tensioner. The tensioner includes a primary member having a narrow plate shaped into a pair of large and small parallel support arms. The large parallel support arm has a cylindrical handle formed contiguous to its free end and a protruding tab with a catch hole and a rivet hole are disposed in the parallel section of its surface to provide for the assembly to the small parallel support arm, thereby enabling the saving of both material and space, while also providing for extremely comfortable manual grasping in a simple structure that prevents slippage. As such, the fabrication procedures of the present invention are simple and convenient, assembly and installation efficiency is increased, and the spindle and the secondary member are structurally straightforward and not difficult to produce.

3 Claims, 8 Drawing Sheets

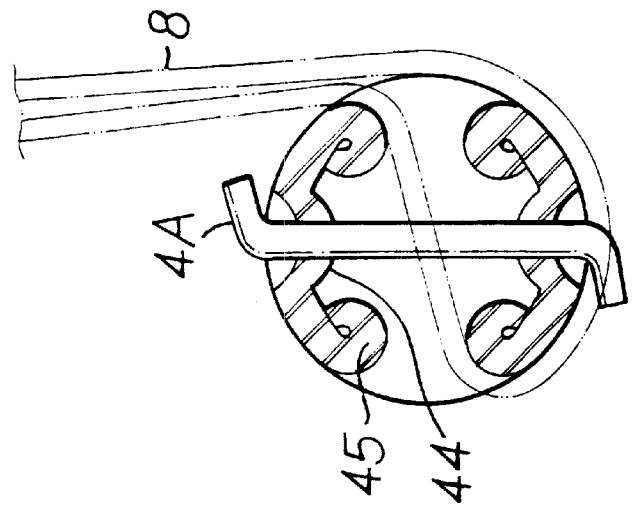
FIG. 6-A
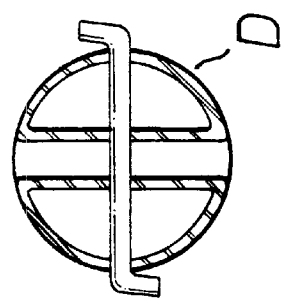
FIG. 1-B
PRIOR ART
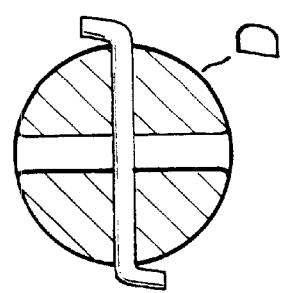
FIG. 1-A
PRIOR ART

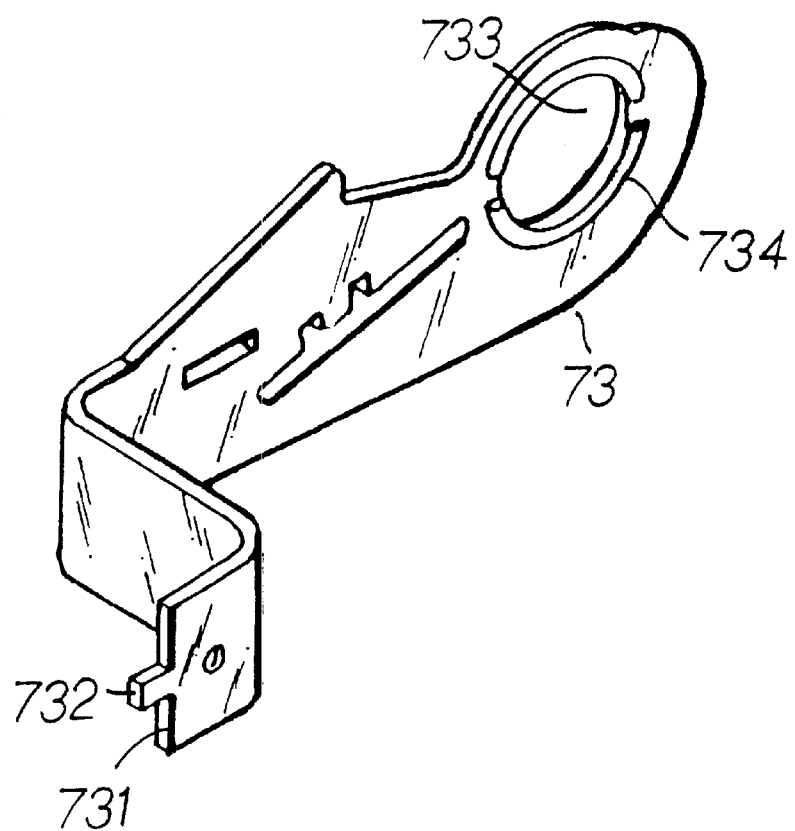
FIG. 4
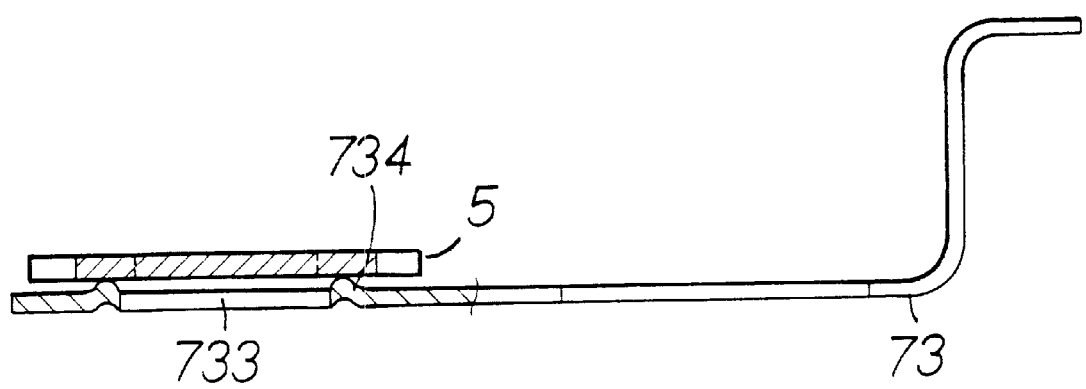
FIG. 4-A

FIG. 6-B

STRUCTURE MANUAL TENSIONER

BACKGROUND OF THE INVENTION

1) Field of the Invention

The invention herein relates to cargo strap cinching devices, specifically an improved structure manual tensioner that saves materials and space, provides for extremely comfortable manual grasping in a simple structure that prevents slippage, and wherein the entire fabrication procedure is simple and convenient to thereby raise assembly and installation efficiency.

2) Description of the Prior Art

In a conventional manual tensioner, as indicated in FIG. 1, the manual tensioner A is comprised of two major sections, a primary and a secondary member B and C, as well as a movably conjoined spindle D that are assembled together, a pair of ratchet wheels E disposed on the spindle D that revolve with the spindle D, check paws C1 movably situated at the inner surface of the secondary member C, each impelled by a spring C2 to engage the ratchet wheels E, drive pawls B1 pivotably disposed at the inner surface of the primary member B, with the drive pawls B1 having a pull lever B11 formed at one end and, furthermore, each impelled by a spring to engage the ratchet wheels E.

Wherein, the primary member B consists of a handle element B2 fabricated of two similarly shaped pieces, a long section B21 formed at one end of the handle element B2 that provides for grasping, a pivot section B22 at the other end of the long section B21 that is angled and, furthermore, when the two handle elements B2 are conjoined, the ends of the long sections B21 are placed side by side, and following the alignment of the long sections B21, rivets F are utilized to fasten the two long sections B21 and to provide for grasping the riveted long sections B21 a soft grip G is sleeved onto the long sections B21 to enable hand comfort and facilitate the operation of the manual tensioner A, in which the manual tensioner A constrains a strap H movably situated within that achieves the convenient tying down of objects, increases operating personnel safety, and prevents the dangerous dropping of heavy objects.

However, the primary member B does not have material and space saving structure, which increases the weight of the primary member B and does not meet the requirements of economic advantage nor provide industrial utility in that the handling of the primary member B during manual operation cannot be further improved.

Furthermore, when two similarly shaped pieces of the handle element B2 are assembled, the use of a plurality of rivets F to fasten the two long sections B21 together is extremely troublesome and requires a riveting machine, which is quite inconvenient and results in complex and disadvantageous assembly tasks as well as poor assembly efficiency.

Additionally, to increase the comfort at the handheld end of the primary member B, a soft grip G must be arduously sleeved on to facilitate grasping which in addition to requiring another component, the soft grip G often becomes displaced while the manual tensioner A is being operated, which is quite hazardous.

Referring to FIG. 1-A and FIG. 1-B, when the two major sections of the primary and secondary members B and C are pivotably conjoined, the paired semicircular halves of a solid or hollow spindle C are also assembled together.

However, when the manual tensioner A is opened, the paired semicircular halves of the solid semicircular spindle D exerts an applied force that constrains the strap H movably situated therein and the structural strength of the paired semicircular halves of the solid spindle 4 is such that the applied force safely sustain loads; however, the material weight of the solid spindles D is large and wastes more material which increases the weight of the manual tensioner A, precluding the improvement of handling during usage, and does not meet the requirements of economic advantage and industrial utility.

Furthermore, when the paired semicircular halves of the hollow spindle C are utilized, although the material weight is lighter and less materials are utilized, the weight of the manual tensioner A is reduced, handling during usage can be improved, and the requirements of economic advantage and industrial utility are met, the structural strength of the paired semicircular halves of the hollow spindle D is such that the applied force to sustain loads is not as high as that of the solid spindle D, the hollow spindle D tends to deform easier and become incapable of withstanding loads, which is dangerous.

Furthermore, when the strap H is secured between the two lateral support arms C3 at the free end of the secondary member C, an insertion hole C4 must first be inconveniently and tediously formed through the walls of the two lateral support arms C3 which in addition to being an unnecessary finishing task of the secondary member C, further complicating the finishing procedures, and precluding increases in production efficiency also requires the prior installation of an anchor bolt I and a nut J when the belt H is assembled between the two lateral support arms C3; as such, the fabrication procedure is quite troublesome and inconvenient, with the assembly structure being rather complex, increasing the overall weight of the secondary member C, wasting material, and rendering the improvement of handling during utilization impossible, which does not meet the requirements of economic advantage and industrial utility.

Therefore, in view of the shortcomings of the conventional structure, there is a need for an improved structure having greater functionality.

SUMMARY OF THE INVENTION

The principal objective of the invention herein is to provide an improved structure manual tensioner in which the primary member consists of a narrow plate of greater and lesser dimensions shaped into a pair of large and small parallel support arms; the large parallel support arm has a cylindrical handle formed contiguous to its free end and a protruding catch hole tab and a rivet hole are disposed in the parallel section of its surface to provide for assembly to the small parallel support arm, thereby enabling the saving of both material and space, which in addition to safety facilitates the control and operation of the manual tensioner such that a strap situated through the manual tensioner can be easily constrained to hold down objects more securely and thereby increase operating personnel safety and prevent the dangerous dropping of heavy objects; and wherein the fabrication procedures of the present invention are simple and convenient, assembly and installation efficiency is increased, and the spindle and the secondary member are structurally straightforward and not difficult to product.

To enable a further understanding of the structural features and operation of the present invention for purposes of evaluation and reference, the brief description of the drawings below is followed by the detailed description of the invention herein.

BRIEF DESCRIPTION OF THE DRAWINGS

FIG. 1-A is a cross-sectional drawing of the conventional structure.

FIG. 1-B is a cross-sectional drawing of the conventional structure.

FIG. 3-A is an isometric drawing of the invention herein after fabrication.

FIG. 4 is an isometric drawing of the invention herein.

FIG. 4-A is a cross-sectional drawing of the invention herein.

FIG. 6-B is an isometric drawing of the spindle of the invention herein.

DETAILED DESCRIPTION OF THE INVENTION

Figure 1:
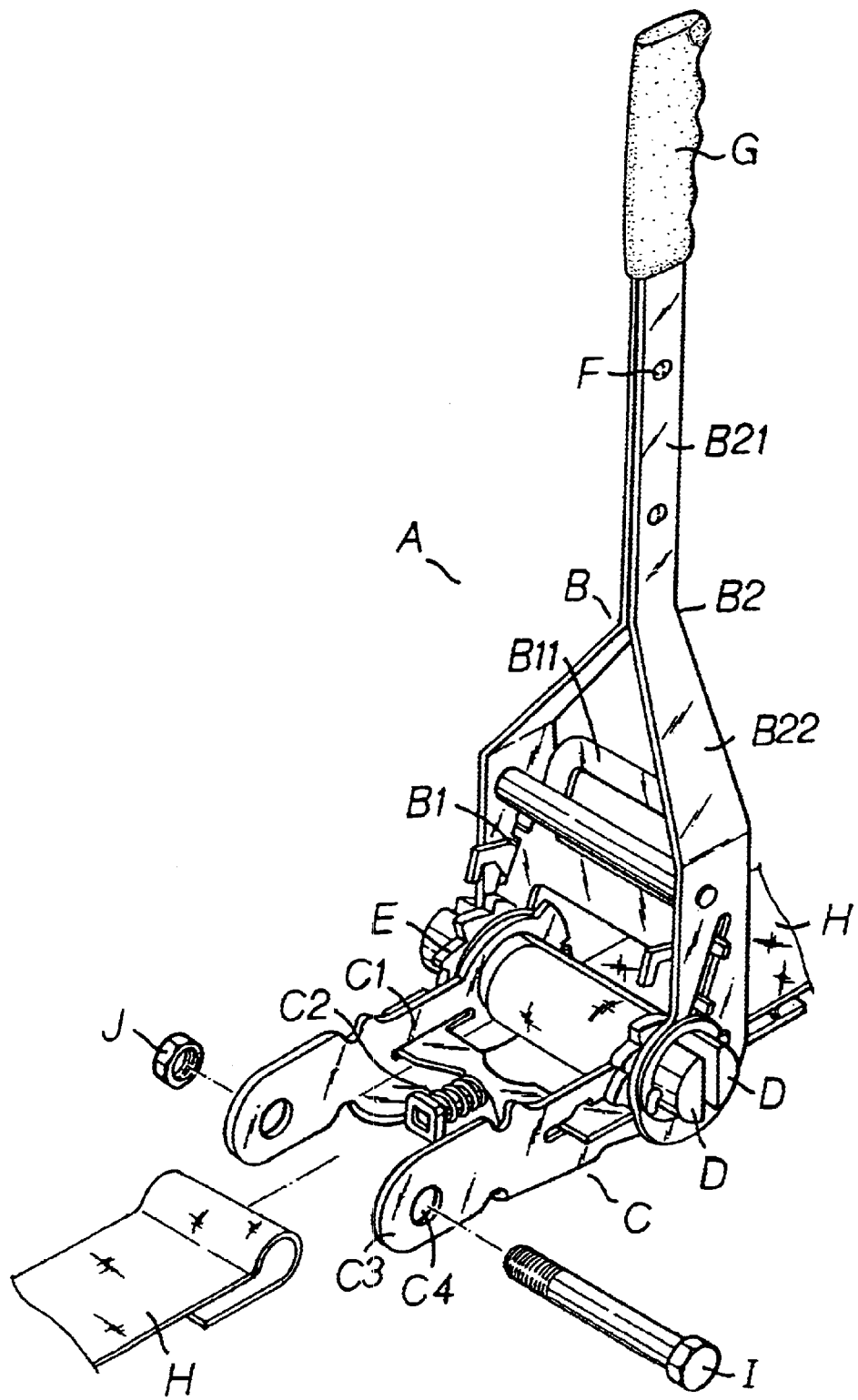
FIG. 1 is an exploded drawing of a conventional structure.
Figure 2:
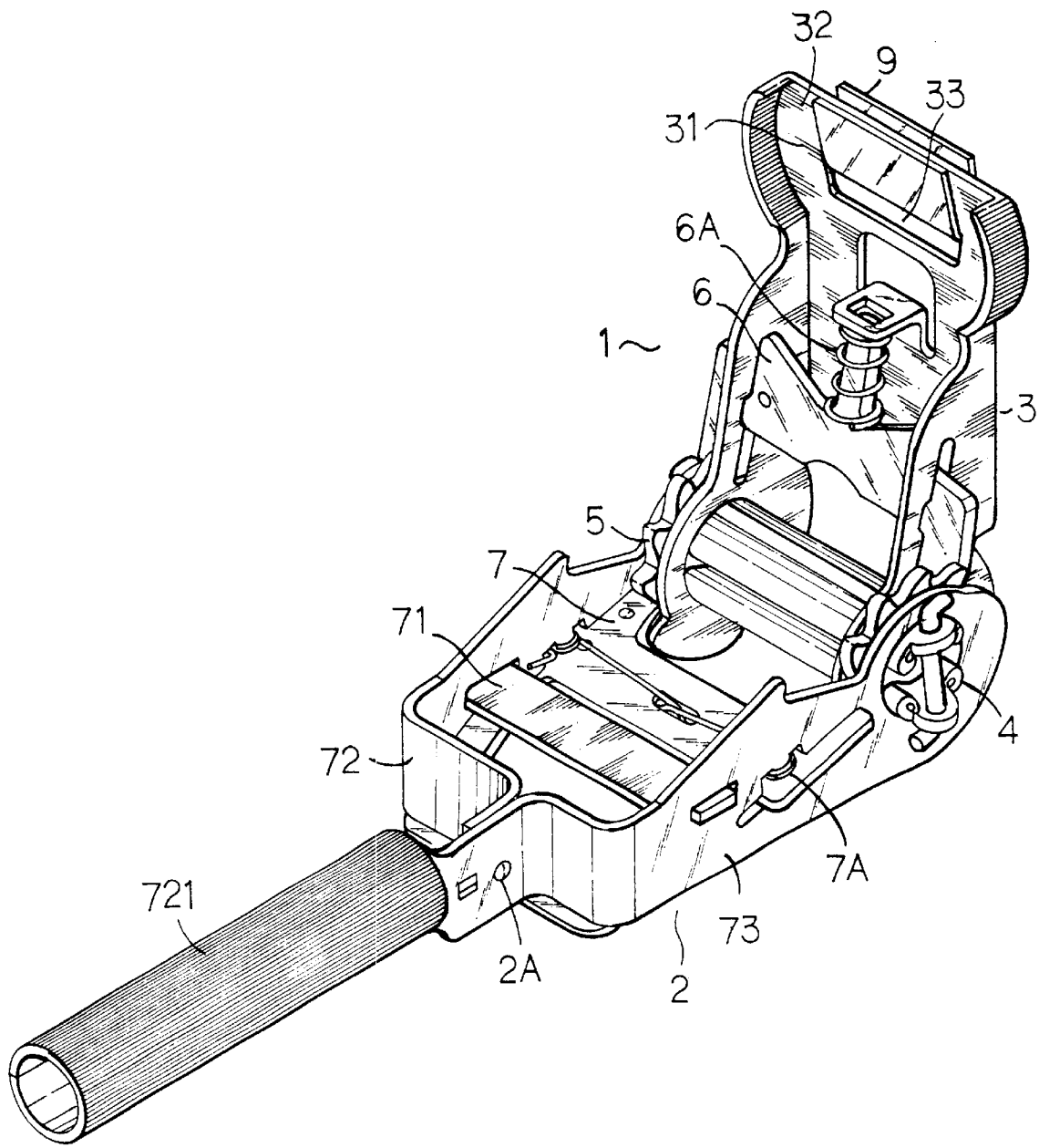
FIG. 2 is an isometric drawing of the invention herein.
Figure 3:
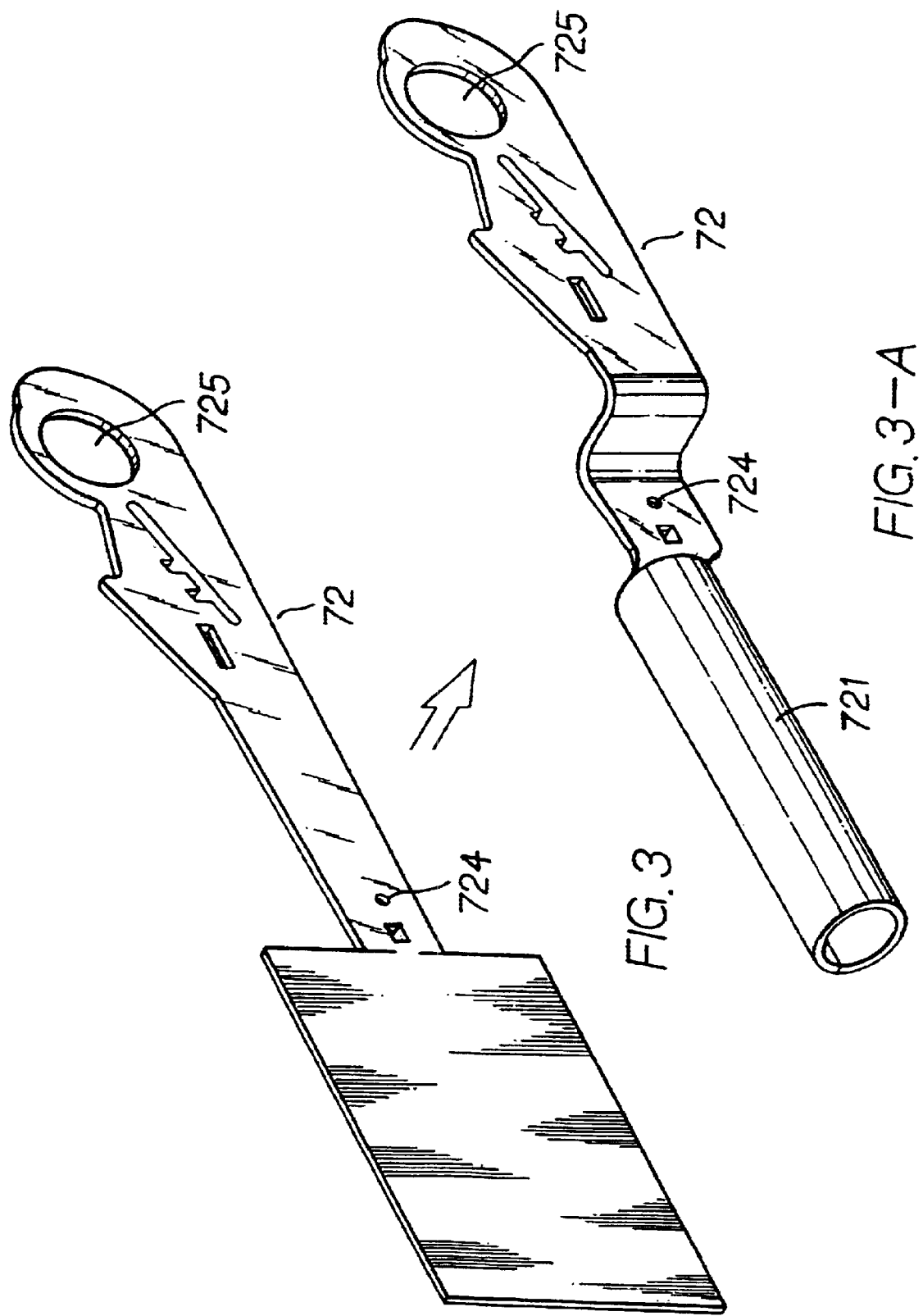
FIG. 3 is an isometric drawing of the invention herein.
Figure 5:
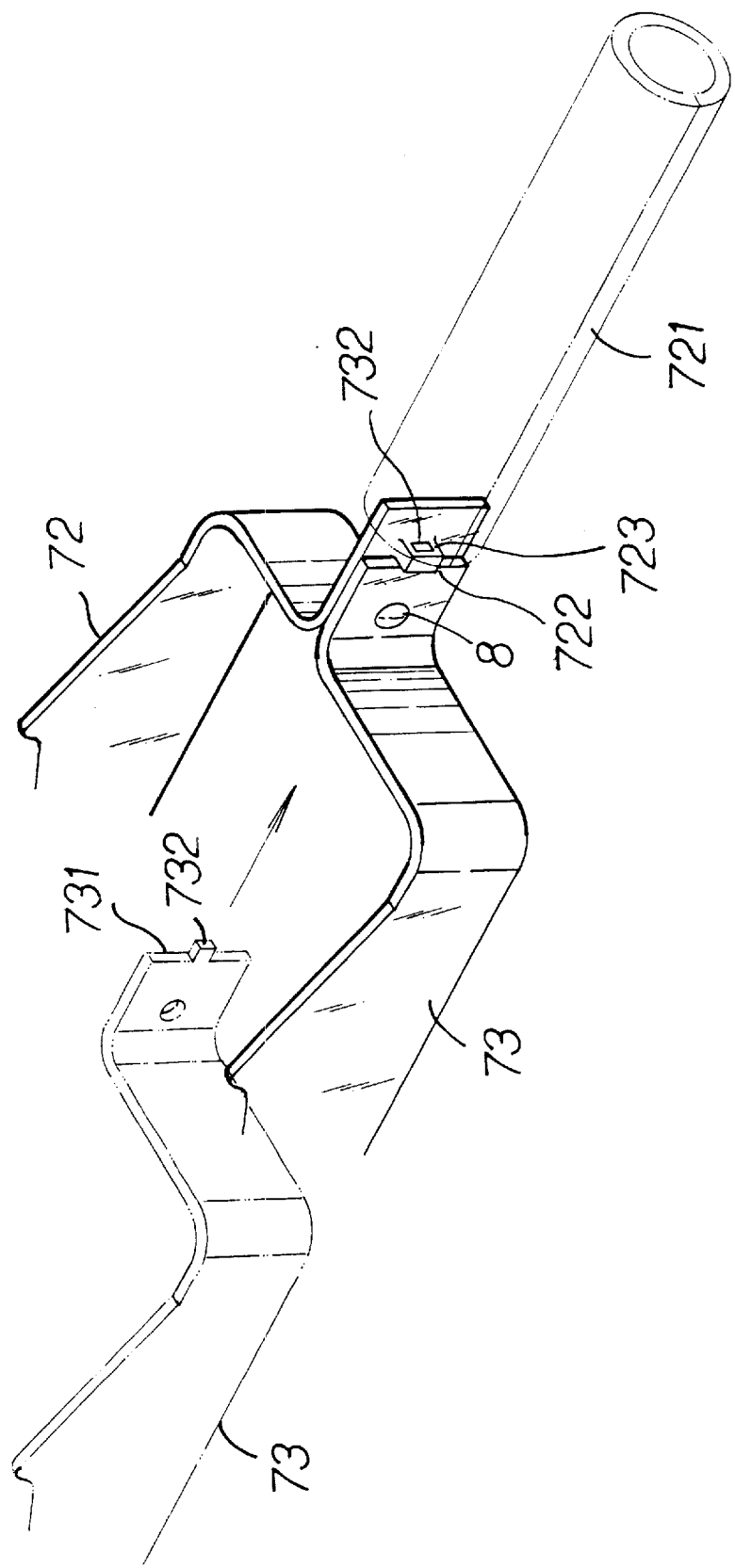
FIG. 5 is an isometric drawing of a structural section of the invention herein.

Referring to FIG. 2, FIG. 3, FIG. 3-A, FIG. 4, FIG. 4-A, and FIG. 5, in the improved structure manual tensioner of the invention herein, the manual tensioner 1 is comprised of two major sections, a primary and a secondary member 2 and 3, as well as a movably conjoined spindle 4 that are assembled together, a pair of ratchet wheels 5 disposed on the spindle 4 that, furthermore, revolve with the spindle 4, check pawls 6 pivotably situated at the inner surface of the secondary member 3 and, furthermore, each impelled by a spring 6A to engage the ratchet wheels 5, drive pawls 7 pivotably disposed at the inner surface of the primary member 2, with the drive pawls 7 having a pull lever 71 formed at one end and, furthermore, each impelled by a spring 7A to engage the ratchet wheels 5, wherein the primary member 2 consists of a narrow plate of greater and lesser dimensions shaped into a pair of large and small parallel support arms 72 and 73, a cylindrical handle 721 extending from the free end of the large parallel support arm 72 that provides for manual grasping, and a protruding tab 722 with a catch hole 723 and a rivet hole 724 disposed in a section of the surface between the large parallel support arm 72 and the handle 721; the lower half of the small parallel support arm 73 and the large parallel support arm 72 are of the same dimensions and the free tip 731 is situated against the large parallel support arm 72 handle 721; the free tip 731 has a tab 732 at its top edge capable of insertion and positioning into the tab 722 having a catch hole 723, with the rivet hole 724 thereby aligned and similarly conjoined by a rivet 2A, enabling the large and small parallel support arms 72 and 73 to be riveted into a single structural entity; spindle holes 725, 733 include a pair of semicircular protrusions 733, 734 and are formed on support arms 72, 73 to provide for the pivotable insertion of the spindle 4, enabling the mounting of the spindle 4 and, furthermore, the spindle 4 and the ratchet wheel 5 revolve together in contact with the semicircular protrusions 734 and do not directly contact the wall surfaces of the large and small parallel support arms 72 and 73 to minimize wear and provide for mechanical smoothness, while also eliminating the disadvantageous need to sleeve of a washer on the spindle 4 to achieve a simplified structure.

Since the pair of large and small parallel support arms 72 and 73 of the primary member 2 are fabricated of a narrow plate of greater and lesser dimensions and the quantity of material utilized for the large and small parallel support arms 72 and 73 is not the same, both material and space are saved; when the controlling manual tensioner 1 is operated, the primary member 2 is grasped and raised, and to further enhance the operation of the controlling manual tensioner 1, the weight of the primary member 2 can be reduced to meet the requirements of economic advantage and provide for industrial utility.

Furthermore, when the large and small parallel support arms 72 and 73 are assembled together, the procedure is extremely convenient because the dimensions at the lower half of the large parallel support arm 72 are the same as that of the small parallel support arm 73, allowing its free tip 731 to be situated against the large parallel support arm 72, and the free tip 731 has a tab 732 at its top edge capable of being inserted and fixed into the tab 722, such that the rivet hole is 724 thereby aligned and similarly conjoined by a rivet 2A, enabling the large and small parallel support arms 72 and 73 to be riveted into a single structural entity; as such, assembling the large and small parallel support arms 72 and 73 into the primary member 2 is quite expedient in that the operation is simple and facilitated to thereby increase assembly and installation efficiency.

At the same time, since the large parallel support arm 72 of the primary member 2 is fabricated of a narrow plate of greater dimensions, not only does this provide for the forming of the cylindrical handle 721 at the free end of the large parallel support arm 72 as well as increasing the structural strength between the handle 721 and the support arms 72 and 73, but also allows for the disposing of an anti-slip pattern along its entire cylindrical surface that directly provides for extremely comfortable grasping in a manner that is structurally simple but prevents loss of grip, which in addition to safety facilitates the control and operation of the manual tensioner 1 such that a strap situated through the manual tensioner 1 can be easily constrained to hold down objects more securely and thereby increase operating personnel safety and prevent the dangerous dropping of heavy objects.

Figure 6:
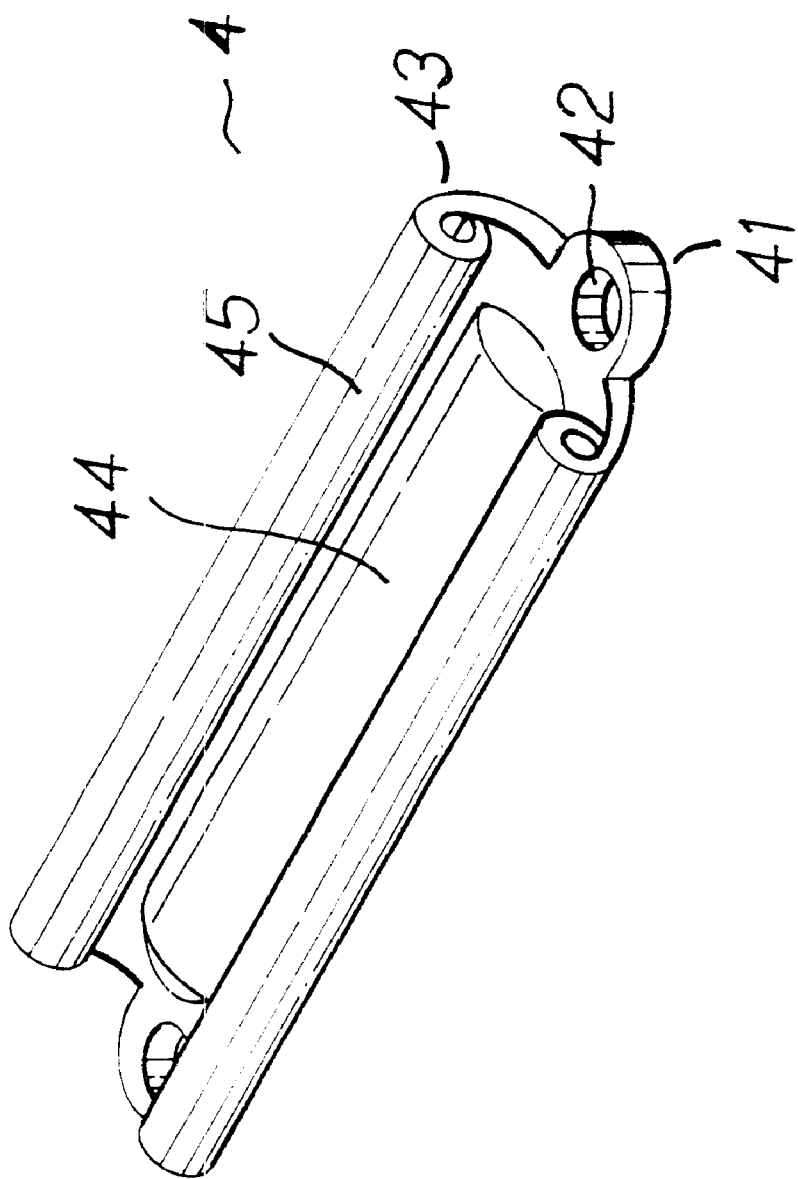
FIG. 6-A is a cross-sectional drawing of the spindle of the invention herein.

Referring to FIG. 6-A and 6-B, the spindle 4 is a single component consisting of two cross-sectionally semicircular and hollow columnar bodies 43, with a fan-shaped lug 41 with a rivet hole 42 protruding from two extremities respectively, an inward facing reinforcing rib 44 is press formed along the bottom surface, and an inward facing rolled edge 45 respectively punched formed along the two sides; following which the spindle 4 is completed by inserting a pin 4A through the rivet holes 42 in the two columnar bodies 43 to provide for movable conjoinment in the two major sections of the primary and secondary members 2 and 3 and when so assembled, so that opening the manual tensioner 1 causes the spindle 4 to exert an applied force that constrains the strap 8 movably situated therein, with the reinforcing ribs 44 press formed along the bottom surfaces of the columnar bodies 43 of the spindle 4 as well as the rolled edge 45 respectively punched formed along their two sides both providing better structural strength and a more hollow construction than the spindle D, enabling the applied force to safely sustain loads; furthermore, the material weight of the spindle 4 is lighter than that of the solid spindle D, thereby wasting less material, reducing the overall weight of the manual tensioner 1, raising handling precision during use, meeting the requirements of economic advantage, and providing industrial utility.

At the same time, the structural strength provided by both the reinforcing ribs 44 press formed along the bottom surfaces as well as the rolled edge 45 respectively punched formed along their two sides of the spindle 4 columnar bodies 43 is such that when the manual tensioner 1 is operated and the spindle 4 exerts an applied force that constrains the strap 8 movably situated therein, the structural strength enables the applied force to sustain loads in a superior manner because the spindle 4 does not easily deform and is not rendered incapable of withstanding loads such that the operation of the manual tensioner 1 is smooth and not prone to mechanical seizure and, therefore, in addition to exceptional safety, the invention herein is capable of constraining the strap 8 to tie down objects reliably to ensure operating personnel safety and prevent the dangerous dropping of heavy objects.

Figure 7:
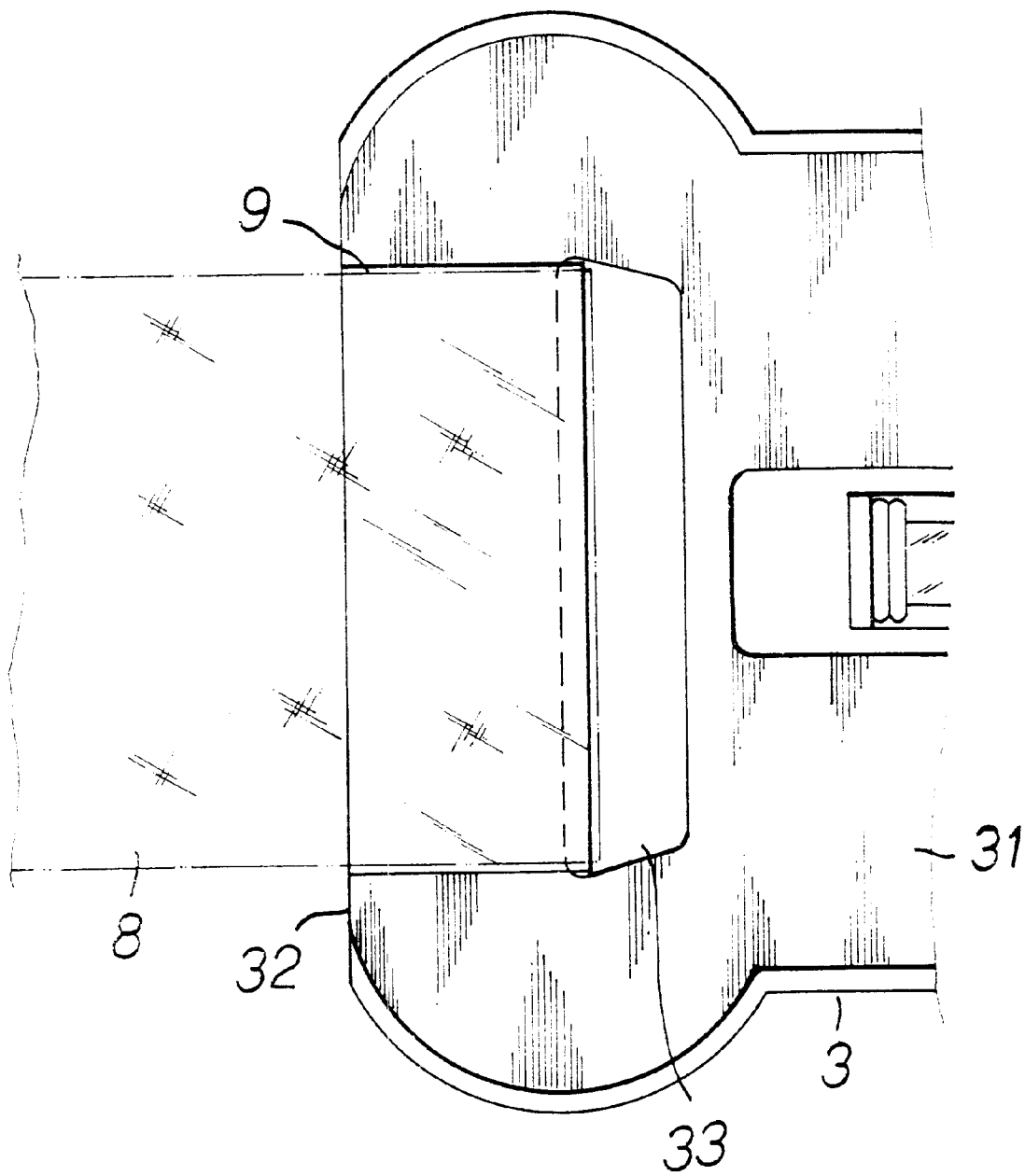
FIG. 7 is an orthographic drawing of the invention herein.

Referring to FIG. 7, when the secondary member 3 provides for the securing of the strap 8, this is extremely convenient, in that it only involves routing the free end 31 on the plate surface 32 and direct insertion through the strap slot 33, following which the strap 8 is slid from the strap slot 33 over the outer side of the plate surface 32 and a friction-proof clamp piece 9, thereby providing for the direct securing of the strap 8 at the free end 31 of the strap slot 33, which in addition to reducing the structural finishing tasks to a level below that of the secondary member B also simplifies finishing task complexity and, therefore, raises overall production efficiency.

Furthermore, when the strap 8 is assembled and secured to the secondary member 3, this is also extremely convenient because the strap 8 is inserted into the strap slot 33 and then the strap 8 is assembled and secured to the secondary member 3 and, as such, not only is the assembly process quite expedient and the assembly structure rather straightforward, but after the free end 31 on the plate surface 32 of the secondary member 3 in inserted through the strap slot 33 and the strap 8 is slid from the strap slot 33 over the outer side of the plate surface 32 and the friction-proof clamp piece 9, in addition to not increasing the overall weight of the secondary member 3, handling precision during use is enhanced, the requirements of economic advantage are met, and industrial utility is provided.

After the strap 8 is slid from the strap slot 33 over the outer side of the plate surface 32 and the friction-proof clamp piece 9, when the manual tensioner 1 is opened and an applied force is exerted to constrain the strap 8 movably situated therein at the strap slot 33, the structural strength of the strap 8 slid from the strap slot 33 over the outer side of the plate surface 32 and the friction-proof clamp piece 9 enables the applied force to sustain loads in a superior manner such that the strap 8 secured in the strap slot 33 does not slip, enabling the strap 8 to tie down objects safely to ensure operating personnel safety and prevent the dangerous dropping of heavy objects.

What is claimed is:

1. A manual tensioner comprising:

a primary member and a secondary member;

a spindle movably conjoins the primary member and the secondary member;

the primary member comprises a pair of large and small parallel support arms, a cylindrical handle extends from a free end of the large parallel support arm, a protruding tab with a catch hole and a rivet hole are disposed in a section of a surface between the large parallel support arm and the cylindrical handle;

a lower half of the small parallel support arm and the large parallel support arm are of similar dimensions and a free tip of the small parallel support arm is positioned against the large parallel support arm;

the free tip of the small parallel support arm includes a tab at its top edge configured for insertion and positioning into the catch hole of the large parallel support arm, the rivet hole of the large parallel support arm is thereby aligned with a corresponding rivet hole of the small parallel support arm and conjoined by a rivet, enabling the large and small parallel support arms to be riveted into a single structural entity, the tab of the free tip of the small parallel support arm extends substantially parallel to the longitudinal length of the cylindrical handle; and the large and small parallel support arms each includes a spindle hole positioned away from the cylindrical handle to provide for the pivotable insertion of the spindle therethrough.

2. The manual tensioner as claimed in claim 1, wherein the spindle is a single component comprising two cross-sectionally semicircular and hollow columnar bodies, each having a fan-shaped lug with a rivet hole protruding from two extremities, an inward facing reinforcing rib press formed along the bottom surface, and an inward facing rolled edge respectively punched formed along the two sides that increase the structural strength of the hollow columnar bodies and the rivet holes provide for riveting the spindle into conjoinment and mounting on the manual tensioner.

3. The manual tensioner as claimed in claim 1, wherein the secondary member of the manual tensioner has a strap slot in a free end of its plate surface that provides for the insertion of a strap; and the strap is slid from the strap slot over the outer side of the plate surface and a friction-proof clamp piece, thereby providing for the direct securing of the strap in the strap slot at the free end.

* * * * *